US009883043B2

(12) United States Patent
Volach

(10) Patent No.: US 9,883,043 B2
(45) Date of Patent: Jan. 30, 2018

(54) MANAGEMENT OF ONLINE INTERACTIONS

(71) Applicant: Pecan Technologies Inc, Road Town, Tortola (VG)

(72) Inventor: Ben Volach, Haifa (IL)

(73) Assignee: PECAN TECHNOLOGIES INC, London (GB)

(*) Notice: Subject to any disclaimer, the term of this patent is extended or adjusted under 35 U.S.C. 154(b) by 286 days.

(21) Appl. No.: 14/464,028

(22) Filed: Aug. 20, 2014

(65) Prior Publication Data

US 2016/0057179 A1 Feb. 25, 2016

(51) Int. Cl.
  *H04L 12/16* (2006.01)
  *H04M 7/00* (2006.01)
  *H04L 29/06* (2006.01)
  *H04L 29/08* (2006.01)

(52) U.S. Cl.
  CPC ........ *H04M 7/006* (2013.01); *H04L 65/1069* (2013.01); *H04L 65/1093* (2013.01); *H04L 67/10* (2013.01); *H04L 67/306* (2013.01)

(58) Field of Classification Search
  None
  See application file for complete search history.

(56) References Cited

U.S. PATENT DOCUMENTS

| 2004/0037396 | A1* | 2/2004 | Gray | H04M 3/436 379/67.1 |
| 2004/0047437 | A1* | 3/2004 | Hamiti | H04L 69/24 375/326 |
| 2010/0022225 | A1 | 1/2010 | Benger et al. | |
| 2011/0267985 | A1* | 11/2011 | Wilkinson | H04M 1/2535 370/259 |
| 2011/0279634 | A1 | 11/2011 | Periyannan et al. | |
| 2013/0094642 | A1 | 4/2013 | Sverdlov et al. | |
| 2016/0330163 | A1* | 11/2016 | Le Gall | H04L 51/28 |

FOREIGN PATENT DOCUMENTS

WO 2009092586 A1 7/2009

* cited by examiner

*Primary Examiner* — Alex Skripnikov
(74) *Attorney, Agent, or Firm* — Browdy and Neimark, PLLC

(57) ABSTRACT

The presently disclosed subject matter includes a system and method for managing interactions between two or more users. In response to a request of a caller to establish an interaction with one or more recipients, the preferences of the caller and the recipients are considered in a process which determines which interaction application is recommended to be used in the requested interaction. A user can be associated with a respective user profile which includes information with respect to the user's communication preferences. The recommendation is generated based on preferences of the users participating in the interaction. In case a conflict is identified between the preferences of different users which are about to participate in the interaction, an arbitration process is executed in which the conflict is resolved.

24 Claims, 6 Drawing Sheets

MANAGEMENT OF ONLINE INTERACTIONS

TECHNICAL FIELD

The presently disclosed subject matter relates to the field of management of data communication between different communication devices.

BACKGROUND

Many communication terminals today are computerized devices configured for communicating different types of data over different types of communication networks. For example, a common Smartphone device enables, among other things, to conduct voice and video calls, to send text messages, download and upload data files, take pictures and transmit them over the network, etc. Furthermore, such communication terminals are capable of running different types of native and downloadable applications which exploit and expand the technical abilities of the device and facilitate different types of interactions with other client devices and service providers. Thus, in addition to the inherent functionalities of common communication terminals, data communication can be executed via a variety of interaction applications which provide different communication services. For example, voice calls and/or text messaging can be performed, using the host (native) phone call applications provided with a communication device and also via other downloadable applications such as Skype™, Viber, WhatsApp, Tango and many more. To further complicate such issues, today many users utilize multiple communication devices such as mobile phones, tablets, notebooks, desktop PCs, smart televisions, and smart wearable devices (like watches or glasses) etc. where each communication device can run the same or different interaction applications.

Publications considered to be relevant as background to the presently disclosed subject matter are listed below. Acknowledgement of the publications herein is not to be inferred as meaning that these are in any way relevant to the patentability of the presently disclosed subject matter.

PCT Application, Publication No. WO2009092586 discloses a method for personalization of service delivery in a packet-based communication environment, wherein users use single or multiple devices and are enabled to run multiple communication and/or content sessions simultaneously, and which is characterized in the steps of registering of said user's devices with a personalization communication control server, collecting information regarding the capabilities of said user's devices including dynamic modifications together with said user's preferences parameters together with the control of the user's current ongoing sessions, media and messages handling, and based on said collected information, specifying policies regarding preferred user actions, dynamically analyzing the status of all said user's devices as well as of all communication and content sessions and taking policy decisions on the basis of said analysis, and personalizing of sessions and their interactions by enforcing said policy decisions via obligations. Furthermore, a related system for personalization of service delivery is disclosed.

The full contents of the above publication are incorporated by reference herein for the purpose of teachings of additional or alternative details, features and/or technical background.

GENERAL DESCRIPTION

According to one aspect of the presently disclosed subject matter there is provided a computerized method of managing interactions between a plurality of users, the users including a caller and one or more recipients; each user is capable of participating in an interaction via a respective communication device; each communication device is capable of running a plurality of interaction applications for enabling interactions with other communication devices over a communication network, the method comprising:

in response to a request received from a first communication device, to conduct an interaction with one or more other communication devices, with the help of a processor performing at least the following:

obtaining interaction preferences of a caller using the first communication device; obtaining interaction preferences of at least one recipient using a respective communication device from among the one or more other communication devices;

providing a recommendation, based at least on the interaction preferences of the caller and the interaction preference of the at least one recipient; the recommendation being indicative of at least one recommended interaction application to be used for data communication in the interaction.

Additional to the above features, the method according to this aspect of the presently disclosed subject matter can optionally comprise one or more of features (i) to (xvii) below, mutatis mutandis, in any desired combination or permutation.

i). wherein the method further comprises determining the interaction preferences of the caller based on information in a personal profile of the caller;
determining the interaction preferences of the at least one recipient based on information in a respective personal profile of the at least one recipient; and applying decision logic for providing the recommendation.

ii). wherein the method further comprises determining a conflict between the interaction preferences of different users; and
applying decision logic for resolving the conflict and providing the recommendation.

iii). wherein the recommendation is provided based on real-time information with respect to the first communication device and/or the one or more other communication devices thus adapting the recommendation to currently available resources.

iv). wherein the real-time information is one or more from a group comprising: battery energy level; available memory; geographical location; network connection quality; and available communication bandwidth.

v). wherein said recommendation is provided based on application data.

vi). wherein the application data is one or more from a group comprising:
fees for using one or more interaction applications; performance of one or more applications; and service provider data.

vii). wherein the recommendation is provided based on superiority between the plurality of users, wherein interaction preferences of a user with greater superiority are assigned with greater weight.

viii). wherein the method further comprises, responsive to the recommendation, automatically initializing the interaction.

ix). wherein the method further comprises obtaining information indicative that the recommended interaction application is missing from a given communication device from among the first communication device and the one or more other communication devices;

sending to the given communication device an invitation to download the at least one recommended interaction application.

x). wherein the method further comprises downloading the at least one recommended interaction application to the given communication device.

xi). wherein the recommendation is indicative of a first interaction application of a first type to be used by a given communication device from among the first communication device and the one or more other communication devices and a second interaction application of a second type to be used by a different communication device from among the first communication device and the one or more other communication devices; the method further comprising:

during the interaction, converting data transmitted from the given communication device to the different communication device, from a format of the first interaction application to a format of the second interaction application; and converting data transmitted from the different communication device to the given communication device, from a format of the second interaction application to a format of the first interaction application.

xii). wherein the first interaction application of the first type is a native voice call application and the second interaction application of the second type is a Voice over IP voice call application.

xiii). wherein the recommendation is indicative of a first presentation format to be used by a given communication device from among the first communication device and the one or more other communication devices and a second presentation format to be used by a different communication device from among the first communication device and the one or more other communication devices; the method further comprising:

during the interaction, converting data transmitted from the given communication device to the different communication device, from the first presentation format to the second presentation format; and converting data transmitted from the different communication device to the given communication device, from a second presentation format to a first presentation format of the first interaction application.

xiv). wherein a given communication device from among the one or more other communication devices is engaged in an ongoing interaction, the method comprising performing one or more of the following:

determining, based on the interaction preferences of a respective recipient using the given communication device, whether or not to interrupt the ongoing interaction; and providing a selection menu to enable the recipient to determine a desired course of action.

xv). wherein the method further comprises providing to a caller a list of possible recipients; receiving, in response to the request, information with respect to the one or more recipients selected from the contact list.

xvi). wherein the method further comprises storing the caller's personal profile and the recipient's personal profiles in a non-transitory data-repository.

xvii). wherein the interaction application comprises: phone call applications; text messaging applications; video call applications; file sharing applications; and any combination thereof.

According to another aspect of the presently disclosed subject matter there is provided a computerized device configured to manage interactions between a plurality of users, the users including a caller and one or more recipients; each user is capable of participating in an interaction via a respective communication device; each communication device is capable of running a plurality of interaction applications for enabling interactions with other communication devices over a communication network; the computerized device comprises a computer memory and at least one processor; in response to a request received from a first communication device, to conduct an interaction with one or more other communication devices, the processor is configured to: obtain interaction preferences of a caller using the first communication device; obtain interaction preferences of at least one recipient using a respective communication device from among the one or more other communication devices; provide a recommendation, based at least on the interaction preferences of the caller and the interaction preference of the at least one recipient; the recommendation being indicative of at least one recommended interaction application to be used for data communication in the interaction.

According to another aspect of the presently disclosed subject matter there is provided a system comprising a plurality of computerized communication devices connected over a network; each device comprising computer memory and at least one processor; the plurality of computerized communication devices comprising:

at least a first communication device, a second communication device and an interaction management server; the server is configured, in response to a request received from the first communication device, to conduct an interaction with at least the second communication device, to obtain interaction preferences of a caller using the first communication device; to obtain interaction preferences of at least one recipient using a respective communication device; to provide a recommendation, based at least on the interaction preferences of the caller and the interaction preference of the at least one recipient; the recommendation being indicative of at least one recommended interaction application to be used for data communication in the interaction.

According to another aspect of the presently disclosed subject matter there is provided a computer program product implemented on a non-transitory computer useable medium having computer readable program code embodied therein for managing interactions between a plurality of users, the users including a caller and one or more recipients; each user is capable of participating in an interaction via a respective communication device; each communication device is capable of running a plurality of interaction applications for enabling interactions with other communication devices over a communication network;

the computer program product comprising: computer readable program code for causing the computer to receive, from a first communication device, a request to conduct an interaction with at least one other communication device;

computer readable program code for causing the computer to obtain interaction preferences of a caller using the first communication device;

computer readable program code for causing the computer to obtain interaction preferences of at least one recipient using a respective communication device from among the one or more other communication devices;

and computer readable program code for causing the computer to provide a recommendation, based at least on the interaction preferences of the caller and the interaction preference of the at least one recipient; the recommendation being indicative of at least one recommended interaction application to be used for data communication in the interaction.

According to another aspect of the presently disclosed subject matter there is provided a non-transitory storage device readable by machine, tangibly embodying a program of instructions executable by the machine to perform a method of managing interactions between a plurality of users, the users including a caller and one or more recipients; each user is capable of participating in an interaction via a respective communication device; each communication device is capable of running a plurality of interaction applications for enabling interactions with other communication devices over a communication network, the method comprising:

in response to a request received from a first communication device, to conduct an interaction with at least one other communication device, with the help of a processor performing at least the following:

obtaining interaction preferences of a caller using the first communication device; obtaining interaction preferences of at least one recipient using a respective communication device from among the one or more other communication devices;

providing a recommendation, based at least on the interaction preferences of the caller and the interaction preference of the at least one recipient; the recommendation being indicative of at least one recommended interaction application to be used for data communication in the interaction.

According to another aspect of the presently disclosed subject matter there is provided a computerized client device configured to communicate with the computerized device mentioned above, the client device comprising at least one processor configured to: send to said computerized device a request to conduct an interaction with one or more other communication devices; receive a recommendation indicative of at least one recommended interaction application to be used for data communication in the interaction; and conduct the interaction according to the recommendation.

According to certain embodiments, the recommendation is a non-final recommendation, the at least one processor is configured to process the received recommendation and provide a final decision based on information available at the client device.

The method, the device, the computer program product, the computer storage device and the system, disclosed in accordance with the presently disclosed subject matter can optionally comprise one or more of features (i) to (xvii) listed above, mutatis mutandis, in any desired combination or permutation.

BRIEF DESCRIPTION OF THE DRAWINGS

In order to understand the invention and to see how it may be carried out in practice, embodiments will now be described, by way of non-limiting example only, with reference to the accompanying drawings, in which.

Figure 1:
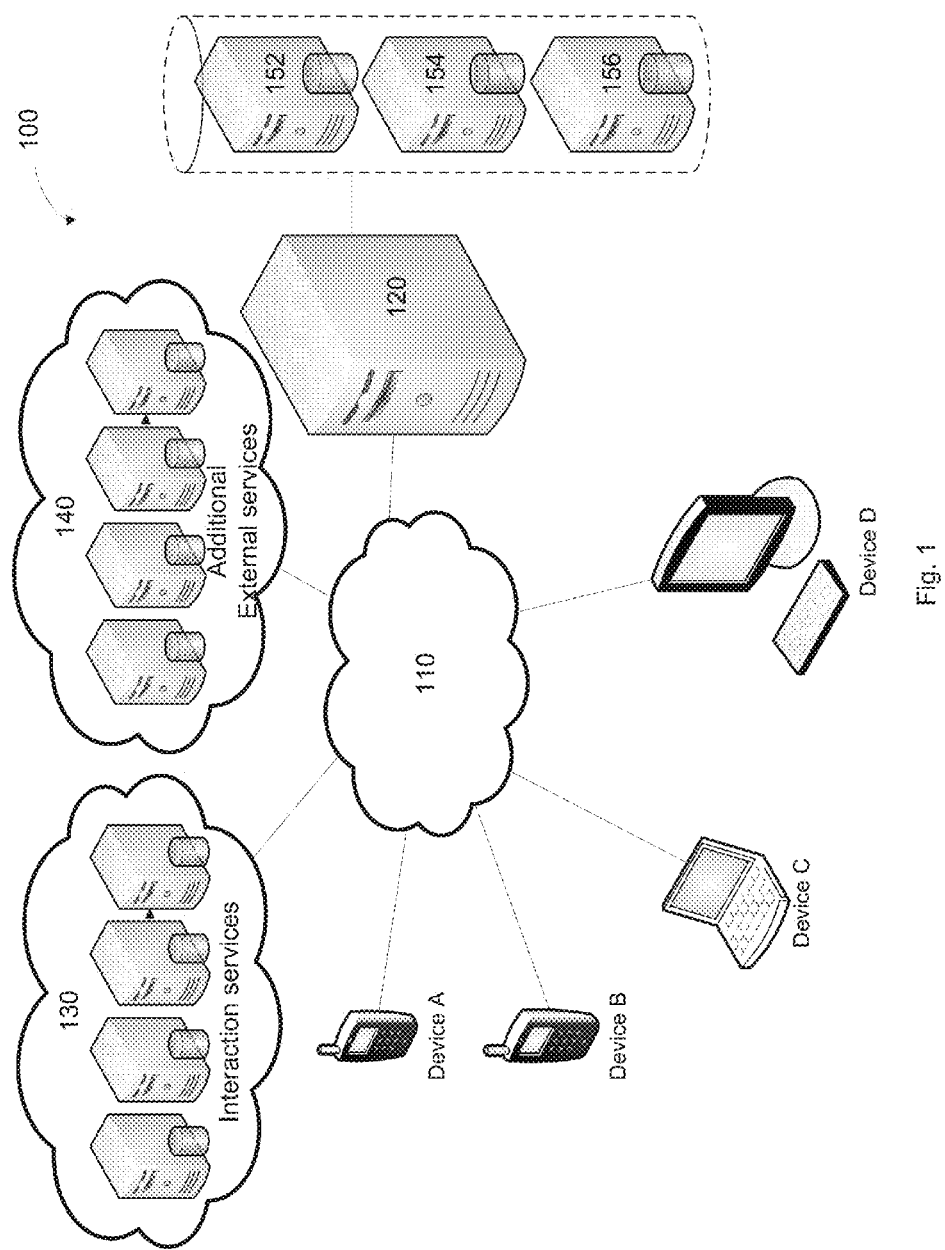
FIG. 1 is a high level functional block diagram schematically illustrating a network enabling management of interaction applications, in accordance with the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions applying terms such as "obtaining" and "providing" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities.

Figure 2:
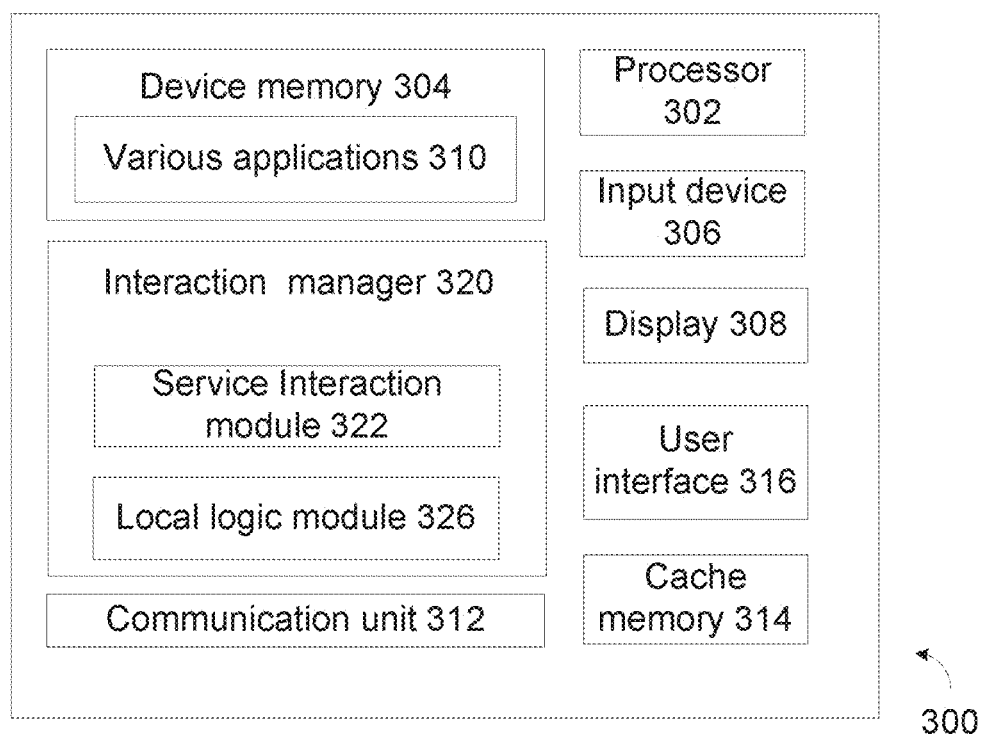
FIG. 2 is a functional block diagram showing an example of a client device, in accordance with the presently disclosed subject matter.
Figure 3:
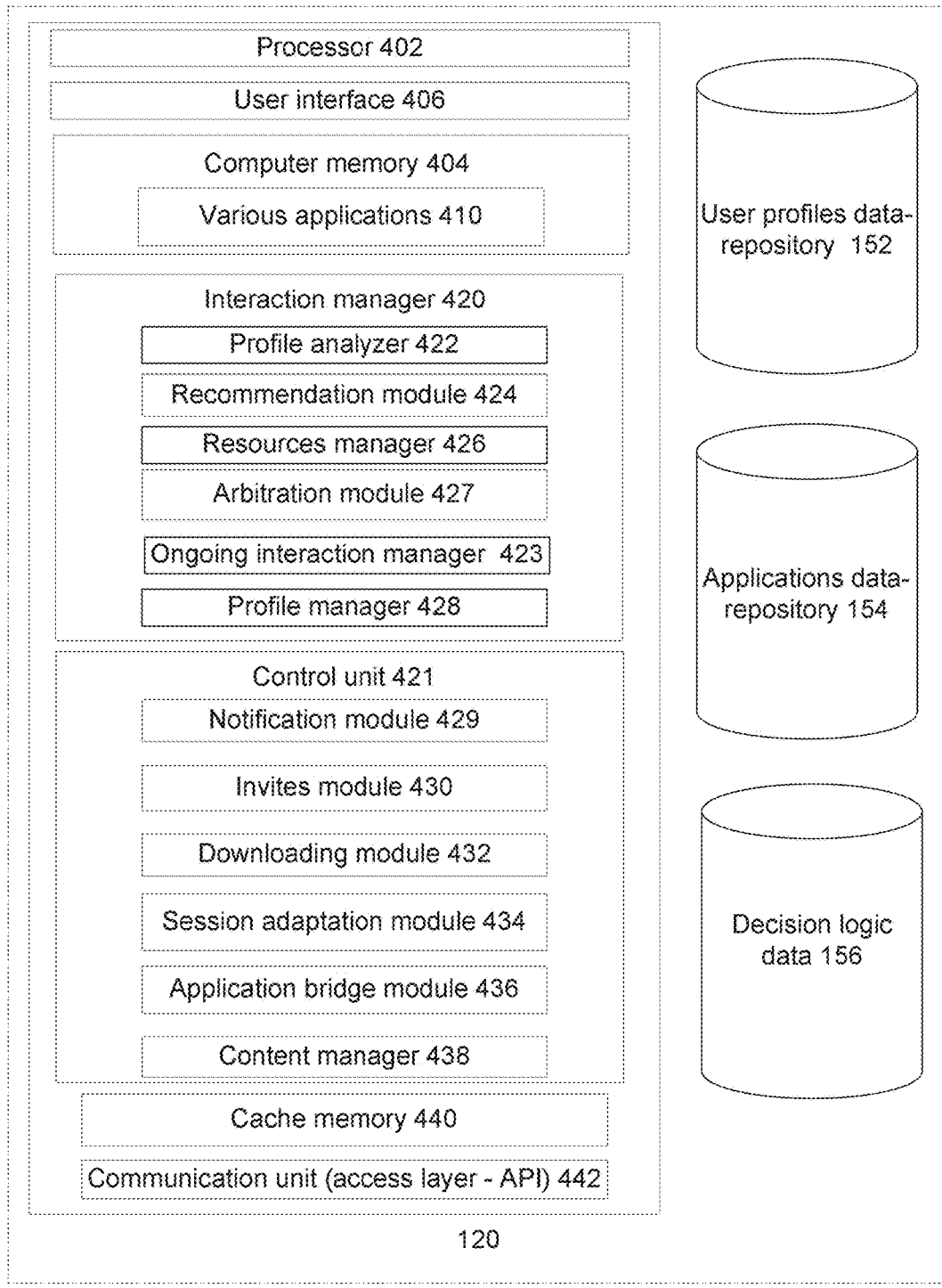
FIG. 3 is a functional block diagram showing an example of interaction application management device, in accordance with the presently disclosed subject matter.

Client device 300 detailed in FIG. 2 and server 120 detailed in FIG. 3 each comprise, or is otherwise operatively connected to a non-transitory computer memory and one or more processors configured to execute operations as disclosed herein. The term processor as used herein should be expansively construed to cover any kind of electronic device with data processing capabilities, including, by way of non-limiting example, a personal computer, a server computer, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer (comprising a computer processor and non-transitory computer memory) specially constructed for the desired purposes or by a general purpose computer specially configured for the desired purpose by a computer program stored in a non-transitory computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 4:
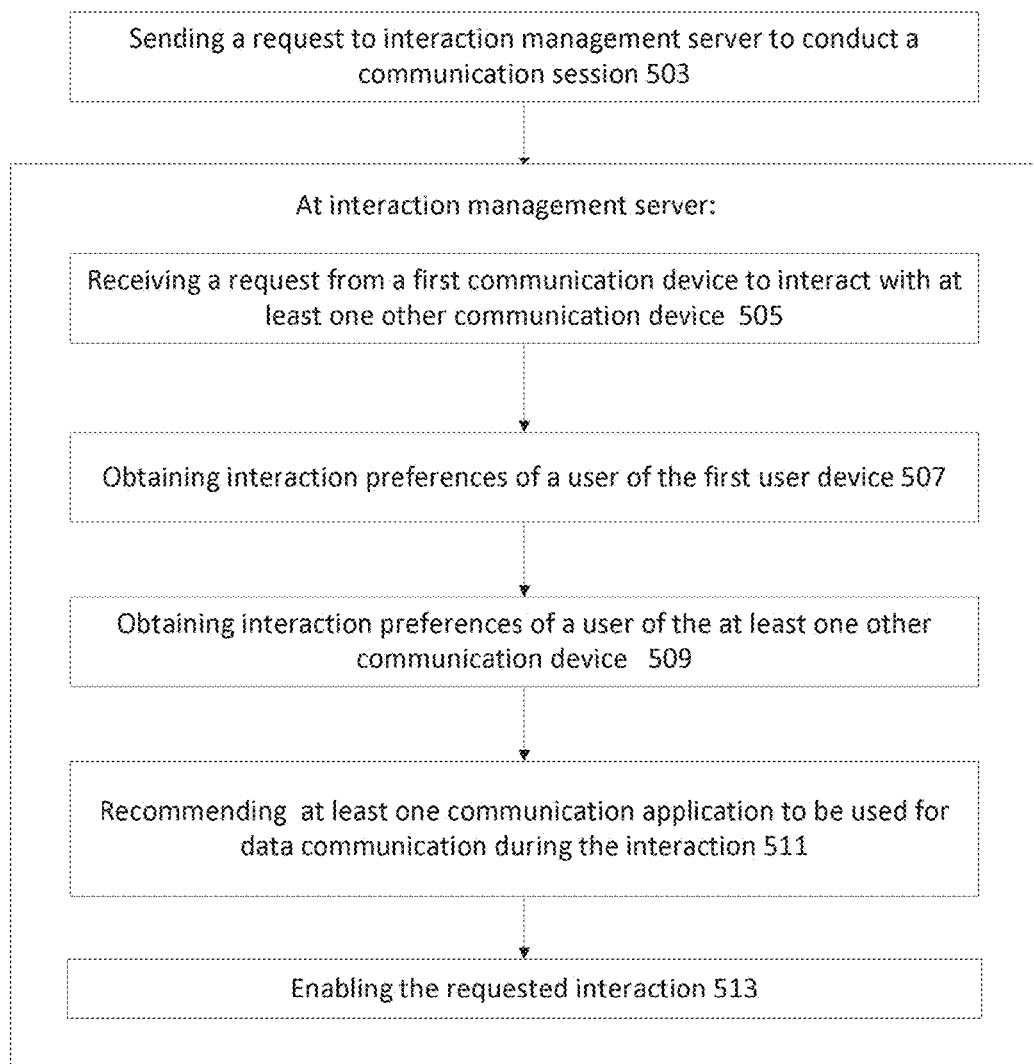
FIG. 4 is a flowchart exemplifying operations which are carried out in accordance with presently disclosed subject matter.
Figure 5:
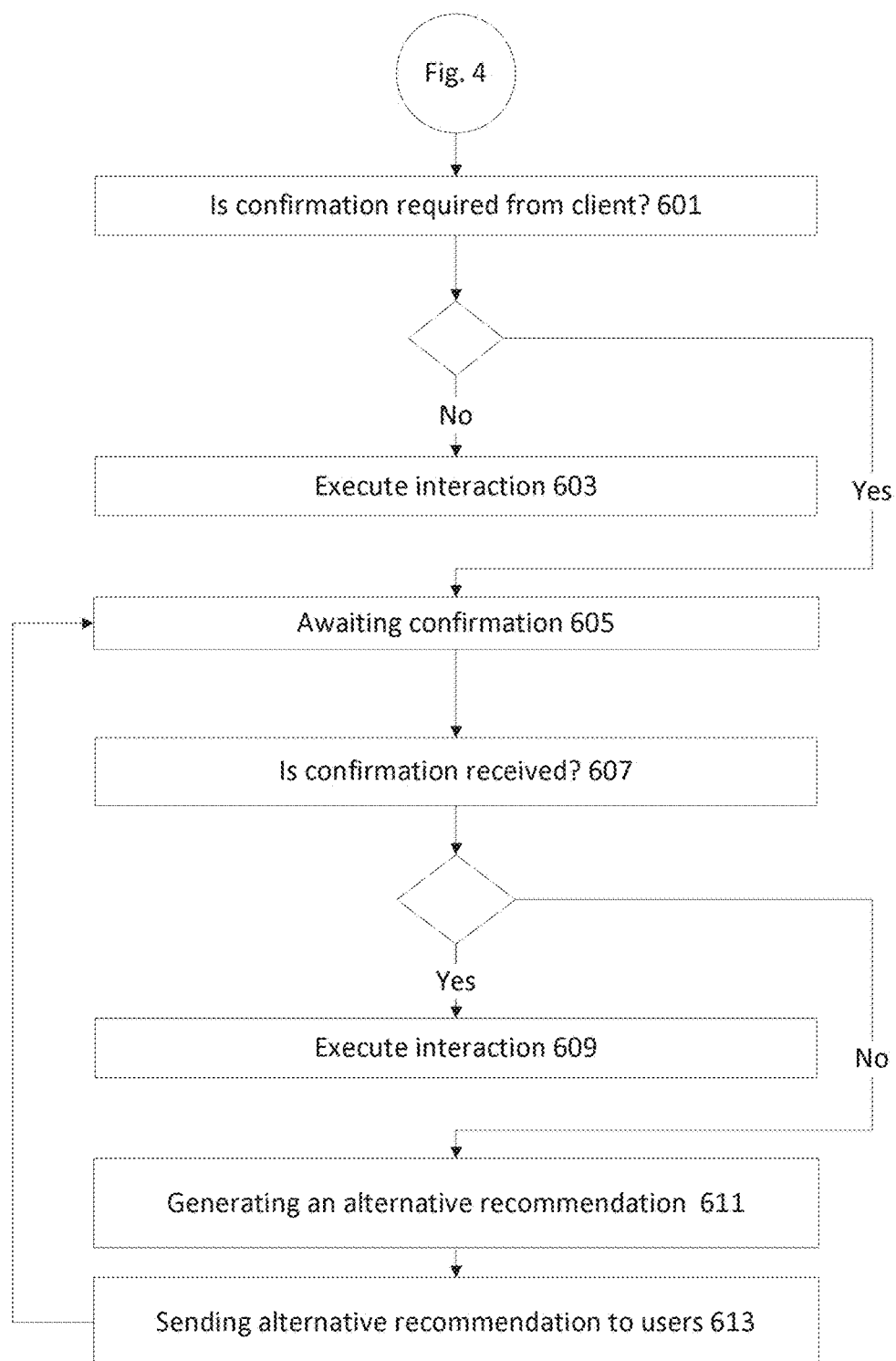
FIG. 5 is a flowchart exemplifying operations which are carried out during a confirmation process, in accordance with presently disclosed subject matter.
Figure 6:
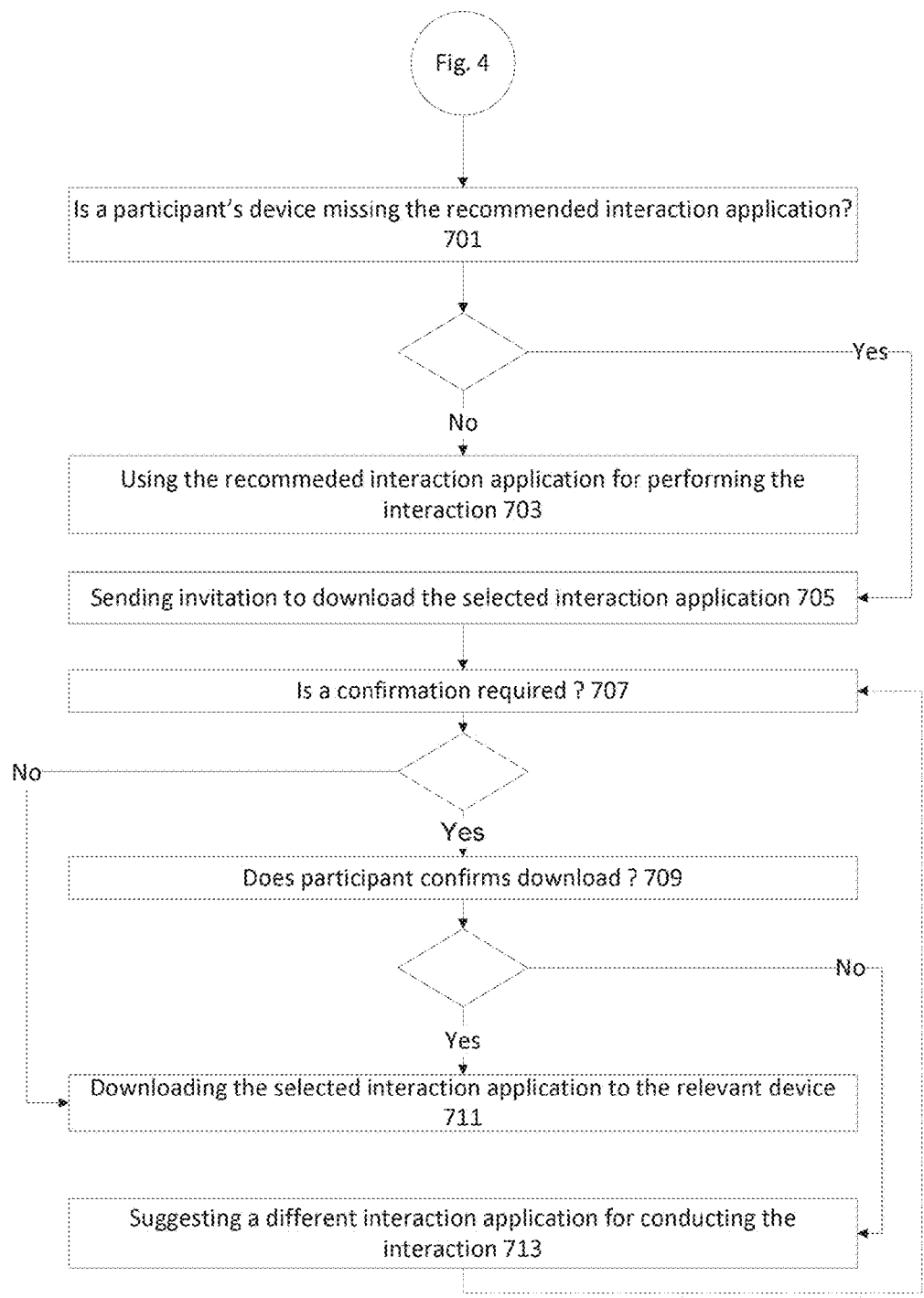
FIG. 6 is a flowchart exemplifying operations which are carried out during a downloading process, in accordance with the presently disclosed subject matter.

In embodiments of the presently disclosed subject matter, fewer, more and/or different stages than those shown in FIGS. 4 to 6 may be executed. In embodiments of the presently disclosed subject matter one or more stages illustrated in FIGS. 4 to 6 may be executed in a different order and/or one or more groups of stages may be executed simultaneously. FIGS. 1 to 3 illustrate a general schematic of the system architecture in accordance with an embodiment of the presently disclosed subject matter. Functional elements in FIGS. 1 to 3 may be centralized in one location or dispersed over more than one location. In other embodiments of the presently disclosed subject matter, the system may comprise fewer, more, and/or different modules/functional elements than those shown in FIGS. 1 to 3.

Definitions of Terms:

The term "data type" (or "types of data") should be broadly construed to include any type of data which is communicated over a communication network including by way of non-limiting example only: audio, video, image, multi-media, presentation, albums, instant message, emoticons, mail messages, chat, other textual data, web data (HTML, JSON), file and media, collaboration (e.g. a shared desktop or co-browsing), activity data (e.g. who is viewing), exchanged state (location, presence, context or profile), provide or get feedback (e.g. like), meta interactions (e.g. poke for attention or flag for importance), associated media actions (such as forward, or share with others), and any other Multipurpose Internet Mail Extensions (MIME), binary data and BLOBs.

The term "interaction" as used herein should be broadly construed to include any type of connection, communication and data transfer between two or more client devices over some type of communication network. Interactions include by way of non-limiting example: communication session such as voice call sessions, video call sessions, multi-party chat session, instant messaging sessions, conference, etc. as well as file sharing of any kind, streaming, and any combination thereof, etc.

The term "interaction application" as used herein should be broadly construed to include any type of application which enables to conduct any type of interaction. Interaction applications include applications that enable the execution of interactions such as those listed above. Interaction applications include by way of non-limiting example: Whatsup, Skype™, Viber, Tango, Dropbox, Picasa, Gmail instant messaging service, Windows Messenger, Facebook Messenger etc.

The term "caller" or "sender" as used herein, refers in general to a user who issues a request to conduct interaction with one or more other users.

The term "recipient" as used herein, refers in general a user who receives a request from a caller to conduct an interaction.

The term "presentation format" as used herein should be broadly construed to include any format in which information is being provided to a user. Presentation formats include for example: text, audio, video, image, etc.

The term "data format conversion" as used herein should be broadly construed to include any conversion of data from one format to another including by way of example: translation of information from one spoken language to another, converting data from one protocol of a given interaction application to another protocol of another interaction application, converting information from one presentation format to another presentation format.

Bearing the above in mind attention is now drawn to FIG. 1 which shows a high level functional block diagram schematically illustrating a network enabling interaction applications management, in accordance with the presently disclosed subject matter.

As mentioned above, it is common today that a communication device is accessible to multiple types of interaction applications for enabling different types of interactions with other devices. Different users, operating different communication devices, have different preferences and may favor some interaction applications over others. Today it is common that the caller selects a desired interaction application for conducting the session. The interaction is made possible, if both the caller and the recipient have the same interaction application running on their respective devices.

The abundance of information types, interaction applications and devices, which are available for communicating information between different users, calls for an interaction management service to enable a seamless and smooth interaction flow, reduce barriers of interaction between communication devices, and consequently improve the quality of service and user experience, for the parties involved in the interaction.

The presently disclosed subject matter includes a system and method for managing interactions between two or more users. In response to a request of a caller to establish an interaction with one or more recipients, the preferences of the caller and the recipients (herein caller and recipients are referred to together also as "participants" or "users") are considered in a process which determines which interaction application is recommended to be used in the requested interaction. A user can be associated with a respective user profile which includes information with respect to the user's communication preferences. The recommendation is generated based on preferences of the users participating in the interaction. In case a conflict is identified between the preferences of different users which are about to participate in the interaction, an arbitration process is executed in which the conflict is resolved.

The network architecture shown in FIG. 1 is a general example which demonstrates some principle elements of the presently disclosed subject matter. Network 110 may be any type of communication network or combination thereof. For example communication can be realized over one or more of the following networks: the Internet, a local area network (LAN), wide area network (WAN), metropolitan area network (MAN), any type of telephone network (including for example PSTN with DSL technology) or mobile network (including for example GSM, GPRS, CDMA etc.), or any combination thereof. Communication in the network can be realized through any suitable connection (including wired or wireless) and communication technology or standard (WiFi, 3G, LTE, etc).

FIG. 1 shows by way of example four communication devices which are connected over communication network 110. The communication devices (clients) are connected to interaction management server 120. FIG. 1 further includes interaction services 130, which schematically illustrate different services which are provided to the clients over the network. Client devices connected to network 110 can communicate with other clients using these communication services. Such services include for example telephone service, email service, instant messaging service, online chat services, file transfer services, etc. The communication services can be for example servers providing access to communication services such as Facebook Messenger, Skype™, Google Hangouts, Viber, WhatApp, Tango, Yammer, Fling, etc.

FIG. 1 further shows additional external services 140 which include different types of information sources which are available by other entities in the network. External services can include for example: positioning and navigation information, location information, pricing and tariffs for data communication, quota or bandwidth limitations by carrier or country, data format conversion service such as language translation, or media conversions (such as TTS—Text To Speech, SR—Speech Recognition, etc.) and others.

Interaction management server 120 in network 110 can be operatively connectible to a number of data-repositories including for example: data-repository 152, data-repository 154 and data-repository 156.

Data repository 152 is configured to store personal profiles of users of the interaction management service as disclosed herein. Users of the interaction management service are in general associated with respective personal profiles which include various data characterizing a respective user. The data in the personal profiles can include part or all of the following information, which is provided herein by way of non-limiting example only:

personal information (age/gender/marital status/residential location/nationality/occupation); different communication devices used by a given user as well as parameters related to each device and its status (e.g. type of the device, OS version; list of interaction applications installed on the device, their versions and configurations; list of content stored on the device; battery type and current battery power level; current network type and strength; memory size and size of free memory; display characteristics; language preferences and settings etc.); contact list.

The personal profile can further include interaction preferences of users (including information explicitly provided by users and information deduced and based on previous behavioral patterns of the user) indicating which of the interaction applications are favored by the given user, including for example:

information with respect to preferences (e.g. in a prioritized manner) for using different applications (e.g. whether a user prefers to use a given application over the other, or in what conditions and/or times a user prefers a given application over the other); information indicative of interaction applications previously used by the user; frequency of usage of different interaction applications; details regarding interaction application usage history and statistics (e.g. frequency of usage of each interaction application on each of the different communication devices; does the user favor a certain interaction application when speaking with one recipient and favor a different interaction application when speaking with a different recipient); user's terms of use when using the different applications (e.g. whether the user is charged for using a given application and what is the required fee in case he is).

Data-repository 154 (application data-repository) is configured for storing information with respect to different interaction applications. Data-repository 154 can include part or all of the following information, which is provided herein by way of non-limiting example only:

a general list of available interaction applications; system requirements of the different applications; user fees for using the different applications; quality of service, ranking of the different interaction applications (e.g. based on users' feedback); statistical information with respect to the different interaction applications (e.g. number of installations of the different interaction applications, distribution of interaction applications according to the preferences of the different users, distribution of interaction applications according to the number of executions of each application by all users), etc.

Data-repository 156 is configured for storing the decision logic and rules for generating a recommendation as to which interaction application to use in a given interaction and for arbitrating between the preferences of two or more users (as indicated by their respective user profiles).

Each of data-repositories 152, 154 and 156 can be configured as an integral part of interaction management server 120 or configured in a separate storage unit connected over a communication link to interaction management server 120. Data-repositories 152, 154 and 156 can be configured in three different storage units (e.g. different storage servers). Alternatively, two or more of data-repositories 152, 154 and 156 can be consolidated in a single storage unit. Data-repositories 152, 154 and 156 can be implemented as designated database servers. Data-repositories 152, 154 and 156 can comprise any appropriate permanent storage medium and may include, by way of non-limiting example, one or more disk units (DUs), also called "disk enclosures", comprising several disk drives (disks).

Clients and servers can be any computerized device configured with adequate computer memory, one or more computer processors for providing processing power and communication facility, including by way of example: computers, server computers, personal computers, portable computers, Smartphones, appliances, watches, televisions, tablet devices etc.

By issuing a request for an interaction session, a user of a communication device (a caller) can initiate an interaction with one or more of the other users (recipients), operating respective communication devices which are connected to network 110. The request is transmitted from the user's client device to interaction management server 120. In response to the request, interaction management server 120 can be configured to search in data-repository 152 for information with respect to the personal profiles of the caller and the one or more recipients. As exemplified above, the information retrieved from data-repository 152 can include, for example, information with respect to the devices of the caller and recipients which are currently available, interaction applications which are available on the different respective devices, and the preferences of the caller and the recipients for using these interaction applications.

As explained in more detail below, interaction management server 120 is configured to provide a recommendation indicating a recommended interaction application to be used in the requested interaction session. The recommendation can be generated based on information obtained from the personal profiles and with the help of the available decision logic.

For example, according to one basic scenario, assume that the caller is attempting to initiate a phone call with a recipient and both the caller and recipient have the same two interaction applications A and B installed on their communication devices. If the personal profiles of both the caller and recipient indicate that they both favor interaction application A over interaction application B, interaction management server 120 can be configured to recommend interaction application A for conducting the phone call. If, on the other hand, the personal profiles of both the caller and recipient indicate that they both favor interaction application B over interaction application A, interaction management server 120 can be configured to recommend interaction application B for conducting the phone call. Additional examples of different requests for initiating an interaction between users and the respective decision logic are provided below.

Turning to FIG. 2, this illustrates an example of a functional block diagram of a client device, in accordance with the presently disclosed subject matter. Communication terminal (or communication/client device) 300 is an example of one possible configuration of functional elements in a client device in network 110 (e.g. devices A to D) as disclosed herein. Client device 300 comprises one or more processors 302 and a computer memory 304 (including persistent computer memory and non-persistent computer memory). Client device 300 further includes a display device 306 (e.g. LCD or LED screen) and input device 308 (e.g. keyboard mouse, touch pad, touch screen, or the like) a (graphical) user interface and a communicating unit 312 facilitating communication of the device with respective communication networks (e.g. LAN, Internet, cellular network, etc.).

Computer memory 304 can include various computer programs 310 including by way of example, an operating system (e.g. Windows, Linux, Android, iOS etc.) and an Internet browsing application (e.g. Google Chrome, Safari, etc.). Client device 300 can further include one or more interaction applications which enable communication with other devices connected over a communication network including both host interaction applications (e.g. provided with the host operating system) and interaction applications which are downloadable from the network.

According to the presently disclosed subject matter, client device 300 further comprises (optionally in device memory 304) interaction manager 320 configured in general, in response to a request to initiate an interaction, to communicate with interaction manager server 120. Interaction manager 320 can comprise by way of example, service interaction module 322, and local decision module 326.

Service interaction module 322 can be configured in general to enable a bi-directional link between client device 300 and interaction server 120. The connection with interaction module 120 allows client device 300 to send information (e.g. instructions, requests, and data) to interaction server 120 as well as receive information (e.g. instructions, requests, data) from the interaction server 120.

For example, responsive to a request of a user of client device 300 to initiate an interaction with one or more recipients connected to the same network, service interaction module 322 can be configured to notify interaction management server 120 of this request. Among other data, service interaction module 322 can be configured to provide communication management server 120 with information indicative of the type of requested interaction (e.g. whether it is a request for an instant messaging session, a phone call, a video call, etc.), one or more target recipients which are indicated by the user, settings and user preferences (as described with reference to FIG. 4), responses to confirmation requests (as described with reference to FIG. 5) or responses to download requests (as described with reference to FIG. 6), as well as other monitoring messages, control messages, or notifications.

Service interaction module 322 can be further configured to collect, store and report to the user information which is received from interaction server 120 as well as actions generated by the user on device 300. For example, such information can include data indicative of the interaction application recommended by server 120 (for example by presenting some type of indication on display 308), the durations of interactions conducted with various recipients by the user, the location or carrier as sensed by device 300, and any information pertaining to the interactions, the user actions, and the user perceived preferences.

Service interaction module 322 can be also configured to send updates to communication management server 120 with respect to changes in the setting of the client device 300. For example, if a new interaction application is downloaded to the client device, service interaction module 322 can send a notification to communication management server 120 notifying the newly downloaded interaction application. Server 120 can thus obtain information of both explicit active user actions (such as downloading an interaction application) and implicit characteristics (such as willingness to interact with a recipient and the duration of such an interaction). Server 120 can use this information to learn and characterize the user preferences as described below.

Local logic module 326 is configured to enable local decision making at the client device. For instance, in some cases a recommendation which is received from interaction management server 120 may not be a final recommendation and may require additional processing at the client device. This may occur for example, where additional information, which is available at the client device and not at server 120, is needed for making a final decision. The additional information can include real-time information such as current battery energy status of the device and/or carrier settings, location of the device, communication signal strength, network type, bandwidth, etc. In such a case logical module 326 is configured to process the received recommendation and provide a final decision to the user based on the relevant and available real-time information.

FIG. 3 is a functional block diagram schematically illustrating interaction management server, in accordance with the presently disclosed subject matter. FIG. 3 is one non-limiting example of a configuration of functional elements in interaction management server 120 for providing the interaction management functionalities disclosed herein. It is noted in general that in other implementations part of the modules illustrated in FIG. 3 can be distributed and located at other remote locations.

Interaction management server 120 can comprise one or more computer processors 402, computer memory 404 (including non-persistent and persistent memory) and a communication unit 442. Interaction management server 120 can further comprise a user interface (including for example a keyboard, mouse and screen). Computer memory 404 can include various applications (Including for example operating system, browser, server application etc.).

According to the presently disclosed subject matter, interaction management server 120 comprises interaction application manager 420 configured in general to receive from a client information indicative of a request of a caller to conduct an interaction with one or more recipients and to provide a recommendation with respect to a recommended interaction application for conducting the requested interaction.

Interaction application manager 420 can comprise for example, profile analyzer 422, recommendation module 424, resource manager 426 and arbitration module 427.

Profile analyzer 422 is configured to obtain the personal profiles of the caller and of the one or more target recipients with which the interaction is required, and to determine their interaction preferences based on the information in the personal profiles.

Recommendation module 424 is configured to determine which interaction application is recommended for conducting a requested interaction. The recommendation which is provided by recommendation module 424 can be based on the preferences as indicated in the profiles of the caller and recipients and can be generated with the help of the decision logic rules. Personal profiles can be obtained for example from data-repository 152 and decision logic rules can be obtained for example from data repository 156.

When generating the recommendation, recommendation module 424 can be configured to consider additional information such as information regarding the different available interaction applications (which can be obtained for example from data-repository 154 and/or from external sources 140), real-time data (which can be obtained for example from any one of interactions service 130; external sources 140; and users' client devices).

Resource manager 426 is configured to acquire local system resources such as date and time, network characteristics, and other types of information detectable by server 120. The information which is obtained by resource manager 426 can be used by arbitration module 427 and assist in performing the arbitration as disclosed below. Resource manager 426 can be further configured to enhance the local knowledge data-repositories (152, 154 and 156) with current and dynamic system information to improve future decision making.

It may occur that a conflict is found between the preferences of different participants (caller and one or more recipients) of an interaction. For example a conflict may be encountered when the caller favors one interaction application and the recipient favors a different interaction application. To this end, interaction application manager 420 can further comprise arbitration module 427 which is configured to execute conflict resolution and assist recommendation module 424 in providing the recommendation with respect to a suitable interaction application for conducting the interaction.

Data repository 156 can comprise the decision logic and rules for generating the recommendation by arbitration module 427. Various examples of recommendation scenarios, where a recommendation is provided by recommendation module 424 and arbitration module 427 are detailed below.

In some cases personal profiles can be generated by communication management server 120 while in other cases the profiles can be generated by other network entities (e.g. a dedicated server) and made available for the user of communication management server 120.

Communication management server 120 can further comprise profile manager 428 configured to generate user profiles, store the user profiles in data-repository 152 and update and manage the stored profiles. Alternatively, the functionalities of profile manager 428 can be provided in a different network entity configured to generate and manage personal profiles (e.g. a dedicated server).

Personal profiles can be generated based on information gathered from different sources including information explicitly provided by the user and information which is inferred based on previous interactions conducted by respective users.

Interaction management server 120 can be accessible to clients that wish to use the interaction management services which are provided by the server. Optionally a user using a client device can access interaction management server 120 (e.g. via a web application running on a web server) and signup to the service. During the signup process a questionnaire can be presented to the user for obtaining data regarding personal information of the user and specific interaction preferences of the user. For example, the user can be asked which of the interaction applications he prefers and rank the different interaction applications. During the signup process the user can also download to his device a communication management client application. The information which is provided by the user can serve as the basic personal profile of the user and can be further enhanced based on the general usage and interaction experience of the user which is recorded at a later stage.

As further mentioned above interaction management server 120 can further comprise or be otherwise connected to an application data-repository 154 designated for storing information with respect to different interaction applications. This information can be used by interaction application manager 420 during the generation of a user's profile. For example, if no other information is available, default preferences of a user can be determined according to statistical information indicating the preferences of most users.

In some cases a request to initiate an interaction with a recipient can be received at interaction management server 120 while the recipient is engaged in another ongoing interaction. The recipient may wish to continue with the ongoing interaction and ignore the incoming one, or he may wish to switch from the ongoing interaction and become engaged in the incoming interaction. According to the presently disclosed subject matter, interaction manager 420 can further comprise ongoing interaction manager 423 configured for handling requests which are received during ongoing interactions.

When a request for interaction is received from a caller, ongoing interaction manager 423 can be configured to determine whether the recipient is already engaged in an interaction. In case the recipient is not engaged in an interaction, ongoing interaction manager 420 proceeds to process the incoming request as described above. Otherwise, in cases where the recipient is engaged in another ongoing interaction, manager 423 can be configured to determine whether the respective personal profile of the recipient contains instructions for handling the request which are received during ongoing interactions (referred to herein as "cross interaction requests").

For example, a user can provide a list of one or more contacts (recipients) which have priority over other contacts. The user can define in his personal profile that when he is engaged in an interaction (e.g. phone call) with one of the listed high priority contacts, he does not wish to be interrupted. Additionally or alternatively, the user can also define in his personal profile that when one of the high priority contacts tries to make contact, any other ongoing interaction should be interrupted.

In case specific instructions are found in the recipient's personal profile, interaction manager 423 proceeds according to the instructions. In case there are no instructions, interaction manager 423 can proceed according to some default instructions for handling cross interaction requests.

For example, responsive to a cross interaction request, ongoing interaction manager 423 can send to the requested recipient an indication of the cross interaction request. The indication can be in the form of a menu listing a number of optional actions which the recipient can perform. The menu can include for instance the following options:

Ignore—the recipient ignores the cross interaction request and continues with the ongoing interaction.

Ignore and send message—same as "ignore" only here the user also sends a message to the caller of the cross interaction, indicating that he is currently engaged in another interaction. In response, ongoing manager 423 can be configured to generate an appropriate message in a format compatible with the interaction application which is used by the caller.

Optionally, a personal profile of the recipient can include the content of the message in some generic form which is translated into the form of the relevant interaction application. Ongoing content manager 423 can be configured to retrieve the message from the respective personal profile of the recipient and configure a message in the required format.

Join—the recipient adds the caller to the ongoing interaction. In case the caller is using an interaction application which is different than the interaction application which is used by the recipient, application bridge module 436 can be used for enabling communication as described below.

Transfer—the recipient leaves the ongoing interaction and connects with the caller of the cross interaction.

An indication to a user with respect to an incoming cross interaction request can be provided in different formats. According to one example, the indication can be provided as an overlay on the screen on top of the currently running interaction application (e.g. in a popup window or banner). According to another example, the indication can be provided via the currently running interaction application. For example, if the recipient is using Skype, the indication can be displayed as a text message on the Skype chat interface.

Interaction management server 120 further comprises control unit 421 which is configured in general to execute operations based on the outcome of the processing performed by interaction application manager 420. Control unit 421 can comprise for example, notification module 429, invite module 430, downloading module 432, session adaptation module 434, application bridge module 436 and content manager 438.

Notification module 429 is configured to send to the caller and possibly also to the other recipients the recommendation provided by interaction manager 420. According to one example, the recommendation can be received by interaction manager 320 at the respective one or more devices, where a corresponding indication to the user can be generated by service interaction module 322.

As explained in more detail below, in some cases, before final execution of the requested session, the recommendation generated by interaction application module 420 can be sent back to the caller and possibly also to the recipients in order to obtain their confirmation. Alternatively, the recommendation generated by interaction management server 120 can be enforced on the participants of the interaction without confirmation by the caller or other interaction participants.

In case a confirmation is received or otherwise in case the recommendation is enforced, communication management server 120 can initiate the interaction by operating the desired interaction application. Alternatively the interaction can be initiated from caller's client device (e.g. with the help of interaction manager 320 which can be configured to operate the relevant interaction applications in response to a recommendation received from server 120).

According to the presently disclosed subject matter, in some cases arbitration module 427 can recommend to use in a requested interaction an interaction application which is not present in one or more (and possibly all) of the communication devices of the participants in a requested interaction.

Invite module 430 can be configured, responsive to a recommendation of interaction application manager 420 to use an interaction application which is absent from one or more of the participants' communication devices, to send an invitation to the relevant devices to download and install the missing application. Alternatively or additionally, downloading module 432 can be configured to initiate a download process of the missing interaction application at the relevant communication devices. The download process can occur following authorization of the user of the relevant client device (e.g. following an invitation made by invite module 430). Alternatively, in other cases the download process can be enforced on the client device and occur automatically.

In addition, according to the presently disclosed subject matter, in some cases a recommendation may suggest that in a given interaction one client will use a first interaction application and another client will use a different interaction application. To this end application bridge module 436 is configured to enable communication between clients, each using a different interaction application by performing data format conversion. This can be achieved for example, by operating a hub which converts information from one communication protocol to another. Information from a first client running a first interaction application is received by application bridge module 436 where it is converted to a format of a second interaction application which is running in another client device and is then sent to its destination.

In addition, or instead of the functionalities of application bridge module 436, in some cases it may be advantageous to alter the presentation format of data when transmitted from one client to the other. To this end session adaptation module 434 in interaction management server 120 can be configured to convert the information which is transmitted during an interaction from one presentation format to another presentation format.

Thus, according to the presently disclosed subject matter, in some cases a recommendation, generated by interaction manager 420, may suggest that in a given interaction one client will communicate using a first presentation format and another client will use a different presentation format. During the interaction the information is transmitted through session adaptation module 434 which is configured to perform data format conversion and convert the information from one presentation format to the other.

For example, in case one user cannot conduct a voice call (e.g. the user is sitting in a library), instead of forcing both users to communicate by text, one user communicates by voice and the other user communicates by text. Alternatively, instead of converting speech to text, the volume of a communication device can be turned down in case it is identified that a respective user is located at a place where making loud sounds is prohibited. In another example, in case a deaf person is interacting with a hearing person, session adaptation module 434 can implement a speech recognition application that can be used for reading the lips of the former, converting it into text or audio and sending the information to the latter.

Personal profiles of participants in an interaction can contain information indicating which presentation format is preferred by the respective user. Alternatively or additionally, interaction manager 420 can obtain real-time data with respect to participants of an interaction and provide, based on the real-time data, a recommendation indicating the presentation format recommended for each user. For example, reverting to the example mentioned above, interaction manager 420 can obtain real-time location information indicating that a first user is in a library and a second user is in the street. A generated recommendation can recommend that the first user uses a text presentation format and the second user uses a voice presentation format. As mentioned above, conversion of the presentation format from voice to text and vice versa can be performed by session adaptation module 434.

Session adaptation module 434 can be further configured to translate data communicated during an interaction to the local user language (e.g. with the help of translation application).

In some cases, a recommendation to use different presentation formats for different participants of an interaction can be implemented by recommending that different participants use different interaction applications. In such a case, application bridge module 436 can be used together with or instead of session adaptation module 434 for converting the information from one presentation format to the other.

It is noted that while application bridge module 436 and session adaptation module 434 are depicted in FIG. 3 as an integral part of interaction server 120 this is done by way of non-limiting example only. In other configurations application bridge module 436 and/or session adaptation module 434 can be implemented in another location in network 110. For example, application bridge module 436 and/or session adaptation module 434 can be implemented in a designated server (e.g. being one of additional external servers 140) connected to network 110.

Content manager 438 is configured to manage information (including text, images, video, sound, etc.) which is stored in the different data-repositories. For example, information which is published by specific server providers (e.g. with respect to discounts) and is stored in data-repository 154 can be retrieved by content manager 438 and provided to a user of the respective interaction application.

During the operation of interaction management server 120, information characterizing the issued recommendation and the communication devices for which the recommendation were issued can be continuously recorded (e.g. with the help of content manager 438). This information is gathered in order to enable to statistically analyze the performance of server 120. For example, the recorded information enables to determine which interaction applications are recommended and/or used most often and in what conditions different interaction applications are recommended.

Optionally, some of the functionalities of interaction management server 120 can be distributed in the communication client device. For example, as mentioned above, some of the decision logic can be executed by the client device where the server 120 generates an initial recommendation and the client uses additional decision logic for obtaining a final recommendation.

FIG. 4 is a flowchart exemplifying operations which are carried out, in accordance with the presently disclosed subject matter. Operations described with reference to FIG. 4 can be performed for example by client device 300 and server 120.

The process starts with a request of a user (caller) of a client device (which is configured with at least the functionalities described above with reference to FIG. 2) to setup an interaction with one or more recipients (block 503).

The caller can interact with interaction manager 320 via user interface 316. According to the presently disclosed matter the request of the user can be directed to interaction manager 320 and not to a specific interaction application. The request which is sent to interaction management server 120 can include for example information with respect to one or more recipients and the type of required interaction (e.g. whether it is text messaging, voice, video, data, or a combination thereof).

The caller can select the recipients which are requested to take part in the interaction in various methods. According to one possible operational scenario, interaction manager 320 can provide the user with access to a contact list of potential recipients. The user can indicate with which of the users he wishes to interact and/or the type of interaction and a respective request is sent by interaction manager 320 (e.g. with the help of service interaction module 322) to interaction server 120.

Additionally or alternatively, the requested recipients can be selected by entering the specific address (e.g. email address) of each recipient, by reciting the recipient's name and a voice recognition application capable of identifying the names or any other possible method.

The request that is sent by the caller is received by interaction management server 120 (block 505). At interaction management server 120, the request is analyzed and the interaction preferences of the caller and the one or more recipients are determined (block 507 and 509). Optionally, the request can also include information with respect to an interaction application that was indicated by the caller as his favored application to be used. For example, interaction manager 320 can be configured to enable a caller to input which interaction application he wishes to use in the interaction. This information can be considered by interaction manager 420 when generating a recommendation (e.g. the application indicated in the request can be given higher priority). However, this does not necessarily mean that the indicated application will be recommended and/or used during the interaction.

A recommendation indicating a suggested interaction application to be used in the requested interaction is then generated (block 511). The recommendation is generated with the help of decision logic (e.g. made available to recommendation module 424) based on the interaction preferences of the caller and of the other one or more participants. In case a conflict is identified between the interaction preferences of the different users, decision logic is utilized for arbitrating between the preferences of the different users.

Optionally, if a personal profile of one of the participants is not available, or if there are one or more target recipients that do not have a personal profile, interaction management server 120 can be configured to provide a recommendation based on the analysis of the currently available information. For example, information indicative of the interaction applications which are stored on a communication device can be obtained directly from the device and information indicative of the most popular interaction applications can be retrieved from data-repository 154. The retrieved data can then be crossed in order to determine which of the most popular interaction applications are also installed on the device.

In some cases, rather than sending a naïve request to interaction management server 120, the request can initially be specifically directed by the caller to perform an interaction using a specific interaction application. The request is directed to interaction management server 120 and rather than performing the interaction with the interaction application indicated in the request, a recommendation with respect to an alternative interaction application is generated by interaction management server 120.

For example, a caller may call a recipient using a native voice call telephone application (e.g. using a 3G/GSM or PSTN protocols) running on the respective client device. Rather than making the call via the native voice call telephone application, the call is directed to interaction management server 120, which recommends conducting the call via another application such as Voice over IP application (e.g. Skype) for example, because Voice over IP interaction can be made over a WiFi network, which is cheaper than the native telephone application.

Responsive to the recommendation issued by interaction management server 120 application bridge module 436 can be configured to operate as a proxy which converts the data received from the caller to the format of the respective application which is being used by the recipient and forward the converted data to the target recipient. Alternatively, both the caller and recipient can proceed and communicate via the recommended interaction application.

Once the recommendation is obtained, the requested interaction between the users is enabled (block 513). As mentioned above, this can be done in various ways, including for example one or more of the following:

1. The recommendation generated by interaction management server 120 may be a final recommendation.

2. The recommendation generated by interaction management server 120 may be a non-final recommendation and a final recommendation is generated at one (e.g. the caller's device) or more of the client devices.

3. Responsive to the recommendation, the interaction can be initiated by the caller's (or any other participants') client device, or it can be initiated by interaction management server 120. In the former case, the request can be redirected back to the caller that in turn can initiate the call using the recommended interaction application.

4. The recommendation can be redirected back to the participants' client device for obtaining user's confirmation or alternatively, the recommended interaction application can be enforced on the participants, in which case the interaction can be initiated automatically without user intervention.

5. During the interaction, interaction management server 120 can perform data conversion and/or data translation.

In some cases, users' interaction preferences and the respective recommendation can be determined based only on the information that is obtained from the respective personal profiles. For example, as mentioned above, the personal profile can include information explicitly indicating which interaction application is favored by the respective user. In other cases, additional information can be used for determining users' interaction preferences and generating the respective recommendation.

Additional information can include, for example, application data (which can be obtained for example from data-repository 154 and/or directly from interaction services 130).

Application data that is retrievable from data-repository 154 can include, for example:
 user fees which may or may not be charged for using different application services. This can include information with respect to differential charges e.g. in different countries, different networks, different times, different days of the week, different locations, etc. The fees for using a given interaction application can be calculated (e.g. by interaction management server 120) based on this information. For example, the calculated fee can refer to the current fee at the current time and current location of the user.
 Performance—information with respect to the performance of different application services. This can include, for example, the bandwidth that is provided by the different application services and/or users' feedback and ranking with respect to the different application services. As before, this can include information with respect to differential performance e.g. in different countries, different networks, different times, different days of the week, different locations, etc.
 Service provider data, such as sponsorship and campaigns—application services may have special offers and benefits for users of their services. For example, reduced fees for users that use their services for certain periods of time and/or some type of benefit that is provided to users that introduce the service to other new users. For example, if, in view of previous usage history, one additional interaction (e.g. voice call) of a given interaction application would grant the user with a certain number of free interactions (e.g. free voice calls), interaction management server 120 may increase the priority of the interaction application.
 As mentioned above, additional information may further include information that is retrievable from the client device and/or from external services 140. For example, real-time information (e.g. the current power level of the battery of the user's communication device, or the current geographical location of the user) can be obtained from the respective device. As mentioned above, such information can assist in determining which interaction application is preferable. For example, in case the battery of a given communication device is low and some applications consume more energy than others. In another example, current geographical location of a communication device can be obtained either directly from the respective device or from an external service (e.g. cellular service provider). This information can assist in determining which interaction application is preferable e.g. in case the fees which are charged for using a given application differ according to the real-time geographical location.

The following non-limiting examples show a number of possible recommendation scenarios that demonstrate possible decision logic that can be implemented by interaction management server 120 in various circumstances. It is noted that these are merely non-limiting examples and recommendations can vary depending on the actual decision logic which is being implemented.

EXAMPLE 1

User 1 has interaction application A (e.g. Skype) ranked as first priority (e.g. ranked 10 out of 10), and user 2 has interaction application A ranked as second priority (e.g. ranked 9 out 10). Application A is the closest match between user 1 and user 2 (e.g. other applications installed on the devices of both users are further apart in their ranking or application A is the only application installed on the client devices of both users).

Recommendation: Application A is recommended.

EXAMPLE 2

Demonstrating Conflict Resolution Logic

User 1 has interaction application A (e.g. Skype) ranked as first priority (e.g. ranked 10 out of 10), and application B (e.g. Viber) ranked as second priority (e.g. ranked 9 out of 10). User 2 has interaction application C ranked as first priority and interaction application B ranked as second priority. Application B is the closest match between user 1 and user 1.

Recommendation: application B is recommended.

EXAMPLE 3

Demonstrating Conflict Resolution Logic

User 1 has interaction application A (e.g. Skype) ranked as first priority (e.g. ranked 10 out of 10), and application B (e.g. Viber) ranked as second priority (e.g. ranked 9 out of 10). User 2 has interaction application B as first priority and interaction application A ranked as second priority. User 2 has priority over user 1 (e.g. user 2 is the boss of user 1).

Recommendation: application B is recommended.

EXAMPLE 4

Demonstrating Conflict Resolution Logic

User 1 requests to initiate a call with 3 other users. All 4 users have interaction application A (e.g. cell-phone host application), interaction application B (e.g. Viber) and interaction application C (e.g. Skype). The different applications have varying ranking in each personal profile of each of the 4 users.

Recommendation: interaction management server 120 calculates which application has the highest overall ranking for all 4 users and recommends that particular application for conducting the session. Optionally, in case one or more of the users have priority over the other users, their ranking of the different applications can be given higher weight when calculating which application has the highest overall ranking.

EXAMPLE 5

Demonstrating Conflict Resolution Logic

User 1 requests to initiate a call with three other users. Three of the four users have interaction application A (e.g. Skype) as first priority interaction application. User 4 does not have Skype downloaded/installed on his device.

Recommendation: interaction management server 120 issues a recommendation to use Skype in the requested interaction as well as a recommendation to user 4 to download and install Skype.

EXAMPLE 6

Demonstrating Use of Real-Time Data

User 1 is sitting in front of a Smart Television at his home residence. User 2 is walking in the street. User 1 requests to initiate a call with User 2. The personal profile of user 1 indicates that most calls made by user 1 via his Smart television were done via interaction application A enabling video calls (e.g. Skype). The personal profile of user 2 indicates that user 2 has interaction application A as first priority, however he never makes video calls when walking in the street.

Recommendation: application A is recommended, however a voice call and not a video call is initiated.

As mentioned above, an issued recommendation can be enforced on the participating clients, or, alternatively, the caller, and possibly also part or all of the other recipients, are required to confirm the recommendation before the interaction is executed.

FIG. 5 is a flowchart exemplifying operations carried out when enforcement is required in accordance with the presently disclosed subject matter. After the recommendation is sent to the communication devices of the participating users from interaction management server 120, if a confirmation is not required, the interaction is executed according to the recommendation (block 603). In such cases the interaction can be executed immediately after the recommendation is generated together with the notification sent to the communication devices.

Otherwise, if a confirmation is required, interaction management server 120 delays execution of the interaction until the required confirmation is received (block 605). Interaction management server 120 can be configured to wait for a certain period of time before determining whether the required confirmation was received or not. In case the time period elapses and the required confirmation is not received, interaction management server 120 can be configured to determine that the confirmation has not been received.

Various recommendation setups can be implemented. According to one example, it is only required that the caller confirms the recommendation, and once he confirms, interaction management server 120 proceeds and executes the interaction. According to another example, it is required that both the caller and part or all of the other participants confirm the recommendation. According to a further example, different users may have superiority over other users (e.g. one user can be defined as supervisor/commander/boss of another user). In such cases confirmation of the recommendation is required from one or more superior users. In cases where multiple participants are invited to take part in the session, it can be required that the majority of participants confirm the recommendation.

Furthermore, the recommendation can optionally be presented as a scale or score (e.g. relevancy score) indicating the level of relevancy of a given interaction application. For example, a score ranging from 0 to 10 can be used where a score of 0 indicates that a given interaction application is not recommended at all and a score of 10 indicates the highest level of a recommendation. The recommendation score indicates the likelihood that a given interaction application would satisfy the participants of the interaction. Optionally, the recommendation can include more than one optional interaction application each presented with a respective score. The caller and/or recipients can select from the list of applications a desired application. For example, in case of multiple participants, the application which is selected by most users can be the one used in the interaction.

If it is determined that the required confirmation is received, the interaction is executed in accordance with the recommendation of server 120 (block 609).

If a confirmation is required and the recommendation is not confirmed, an alternative recommendation can be issued by interaction management server 120 (block 611). The second recommendation can include an alternative interaction application for conducting the interaction.

The alternative recommendation can be sent to the participants' communication devices for receiving confirmation from the users (block 613). If the required confirmation is received, the interaction can be executed.

Optionally, the process can be repeated where additional alternative recommendations are sent to the participants until the recommended application is confirmed or until all possibilities are exhausted or until some other threshold is reached.

The recommendation generated by interaction management server 120 may sometimes require, in addition to execution of the interaction, other operations to be executed by the server and/or the communication devices. These operations include for example, downloading of missing applications and conversion of data formats and/or translation of data. As mentioned above, a recommendation generated by server 120 can suggest or enforce the communication device to download an interaction application which is absent from the device in order to enable to conduct the interaction using the downloaded application.

One example of a scenario which may set off a recommendation to download an interaction application is example 5 described above. Another example is a scenario where a caller initiates a voice call with one recipient and while the caller favors voice call application A, the recipient favors, to a similar degree, voice call application B. Application A is not installed on the recipient's device and application B is not installed on the caller's device. In such a case a conflict arises between the preferences of the two participants. Assume that the caller is superior in rank over the recipient (e.g. his boss or army commander). In such a case, arbitration module 427 can recommend/enforce that the recipient downloads and installs application A.

In another example, assume that interaction application manager 420 obtained from application data-repository 154 information with respect to a third phone application which is positively reviewed by many users. In such a case, arbitration module 427 can recommend to use the third application, even though it is not installed on the caller's device or on the recipient's device.

FIG. 6 is a flowchart exemplifying a sequence of operations performed in accordance with the presently disclosed subject matter. At block 701 it is determined (e.g. with the help of interaction application manager 420) whether the selected interaction application is absent from any one of the participating devices (the communication devices which are about to take part in the requested interaction). In case the selected interaction application is installed on all participating devices, the interaction can be initiated using the interaction application selected by interaction application manager as described above (block 703). As described above with reference to FIG. 5, the interaction proceeds depending on whether a confirmation from one or more of the participants is required or not.

Otherwise, in case the selected interaction application is missing from one or more of the participating devices, an invitation to download the missing application is sent to the relevant communication device (block 705). The logic leading to a decision to invite a client device to download a missing interaction application has been explained above.

Optionally, permission to download the missing interaction application is required before commencement of a download process. In case a confirmation to download is required (block 707) it is first determined whether the participant (i.e. caller or recipient) confirms to download the interaction application (block 709). In cases where the participant confirms to download the interaction application, the downloading process begins (block 711). Otherwise, if the participant does not confirm to download the missing interaction application, an alternative application can be suggested instead of the missing application (block 713). The alternative interaction application can be another application that has to be downloaded by the respective client or an interaction application which is already installed on the communication device.

In some cases, downloading of a missing interaction application can be done automatically without conditional confirmation of the participant. For example, in cases where a user's personal profile indicates that the user agreed to allow automatic downloading of any missing recommended interaction application when signing up for the service.

Another process which may be initiated in response to a recommendation issued by interaction management server 120 is a data format conversion process. As mentioned above, various types of data format conversion can be performed.

A recommendation generated by server 120 can suggest that different communication devices use, in the same interaction, different interaction applications or different presentation formats. In order to enable communication between the different communication devices, interaction management server 120 can be configured to enable data format conversion of data received from one communication device in a first format to a second format compatible with a second communication device.

The invention claimed is:

1. A computerized method of managing interactions between a plurality of users, the users including a caller and one or more recipients; each user being capable of participating in an interaction via a respective communication device, each communication device being configured to run a plurality of interaction applications for conducting interactions with other communication devices executed on a communication network, the method comprising:
    in response to a request received from a first communication device to conduct an interaction with one or more other communication devices, with the help of a processor, performing at least the following:
    obtaining interaction preferences of a caller using the first communication device, wherein the interaction preferences of the caller include information indicative of at least one preferred caller interaction application for conducting the interaction;
    obtaining interaction preferences of at least one recipient using a respective communication device from among the one or more other communication devices, wherein the interaction preferences of the at least one recipient include information indicative of at least one preferred recipient interaction application for conducting the interaction;
    determining whether there is a conflict between the interaction preferences of different users, wherein the at least one preferred caller interaction application is different than the at least one preferred recipient interaction application, and applying decision logic for resolving the conflict;
    providing a recommendation, based at least on the interaction preferences of the caller including the at least one preferred caller interaction application and the interaction preference of the at least one recipient including the at least one recipient interaction application;
    wherein the recommendation is indicative of at least one recommended interaction application to be used for data communication in the interaction;
    obtaining information indicative that the recommended interaction application is missing from a given communication device from among the first communication device and the one or more other communication devices; and sending to the given communication device an invitation to download the at least one recommended interaction application.

2. The method according to claim 1, wherein the obtaining of interaction preferences of the caller further comprises:
determining the interaction preferences of the caller based on information in a personal profile of the caller; and
the obtaining of interaction preferences of the at least one recipient further comprises:
determining the interaction preferences of the at least one recipient based on information in a respective personal profile of the at least one recipient.

3. The method according to claim 1, wherein the recommendation is provided based on real-real time information with respect to the first communication device and/or the one or more other communication devices thereby adapting the recommendation to the currently available resources.

4. The method according to claim 3, wherein the real-time information is one or more from a group comprising: battery energy level; available memory; geographical location; network connection quality; and available communication bandwidth.

5. The method according to claim 1, wherein said recommendation is provided based on application data.

6. The method according to claim 5, wherein the application data is one or more from a group comprising:
fees for using one or more interaction applications; performance of one or more applications; and service provider data.

7. The method according to claim 1, wherein the recommendation is provided based on superiority between the plurality of users, wherein interaction preferences of a user with greater superiority are assigned with greater weight.

8. The method according to claim 1, further comprising, responsive to the recommendation, automatically initializing the interaction.

9. The method according to claim 1, further comprising downloading the at least one recommended interaction application to the given communication device.

10. The method according to claim 1, wherein the recommendation is indicative of a first format to be used by the given communication device from among the first communication device and the one or more other communication devices and a second format to be used by a different communication device from among the first communication device and the one or more other communication devices; the method further comprising:
during the interaction, converting data transmitted from the given communication device to the different communication device, from the first format to the second format; and
converting data transmitted from the different communication device to the given communication device, from the second format to the first format of the first interaction application.

11. The method according to claim 1, wherein when the given communication device from among the one or more other communication devices is engaged in an ongoing interaction, the method comprising performing one or more of the following:
determining, based on the interaction preferences of a respective recipient using the given communication device, whether or not to interrupt the ongoing interaction; and providing a selection menu to enable the recipient to determine a desired course of action.

12. The method according to claim 1 further comprising:
scoring one or more interaction application with a relevancy score, the relevancy score indicating the level of relevancy of a given interaction application; and
wherein said recommendation includes an indication of the relevancy score.

13. The method according to claim 1 further comprising:
wherein the recommendation is indicative of a plurality of recommended interaction applications which are able to be used for data communication in the interaction; and
obtaining a selection of an interaction application from among the plurality of recommended interaction applications, the selected interaction application being used for data communication in the interaction.

14. A computerized method of managing interactions between a plurality of users, the users including a caller and one or more recipients; each user being capable of participating in an interaction via a respective communication device, each communication device being configured to run a plurality of interaction applications for conducting interactions with other communication devices executed on a communication network, the method comprising:
in response to a request received from a first communication device to conduct an interaction with one or more other communication devices, with the help of a processor, performing at least the following:
obtaining interaction preferences of a caller using the first communication device, wherein the interaction preferences of the caller include information indicative of at least one preferred caller interaction application for conducting the interaction;
obtaining interaction preferences of at least one recipient using a respective communication device from among the one or more other communication devices, wherein the interaction preferences of the at least one recipient include information indicative of at least one preferred recipient interaction application for conducting the interaction;
determining whether there is a conflict between the interaction preferences of different users, wherein the at least one preferred caller interaction application is different than the at least one preferred recipient interaction application, and applying decision logic for resolving the conflict;
providing a recommendation, based at least on the interaction preferences of the caller including the at least one preferred caller interaction application and the interaction preference of the at least one recipient including the at least one recipient interaction application; wherein the recommendation is indicative of at least one recommended interaction application to be used for data communication in the interaction;
wherein the recommendation is further indicative of a first interaction application of a first type to be used by a given communication device from among the first communication device and the one or more other communication devices and a second interaction application of a second type to be used by a different communication device from among the first communication device and the one or more other communication devices;
during the interaction, converting data transmitted from the given communication device to the different communication device, from a format of the first interaction application to a format of the second interaction application; and converting data transmitted from the different communication device to the given communication device, from the format of the second interaction application to the format of the first interaction application.

15. The method according to claim 14, wherein the first interaction application of the first type is a native voice call application and the second interaction application of the second type is a Voice over IP voice call application.

16. A computerized device configured to manage interactions between a plurality of users, the users including a caller and one or more recipients; each user is capable of participating in an interaction via a respective communication device; each communication device is capable of running a plurality of interaction applications for conducting interactions with other communication devices executed on a communication network; the computerized device comprises at least one processor;

in response to a request received from a first communication device, to conduct an interaction with one or more other communication devices, the at least one processor is configured to:

obtain interaction preferences of a caller using the first communication device, wherein the interaction preferences of the caller include information indicative of at least one preferred caller interaction application for conducting the interaction;

obtain interaction preferences of at least one recipient using a respective communication device from among the one or more other communication devices, wherein the interaction preferences of the at least one recipient include information indicative of at least one preferred recipient interaction application for conducting the interaction;

determine whether there is a conflict between the interaction preferences of different users, wherein the at least one preferred caller interaction application is different than the at least one preferred recipient interaction application, and applying decision logic for resolving the conflict;

provide a recommendation, based at least on the interaction preferences of the caller including the at least one preferred caller interaction application and the interaction preference of the at least one recipient including the at least one recipient interaction application;

wherein the recommendation is indicative of at least one recommended interaction application to be used for data communication in the interaction;

obtain information indicative that the recommended interaction application is missing from a given communication device from among the first communication device and the one or more other communication devices; and send to the given communication device an invitation to download the at least one recommended interaction application.

17. The computerized device according to claim 16, wherein the at least one processor is configured to adapt the recommendation to the currently available resources comprising: obtaining real-time information and providing recommendation based on real-real time information with respect to the first communication device and/or the one or more other communication devices.

18. The computerized device according to claim 16, wherein the recommendation is indicative of a first format to be used by the given communication device from among the first communication device and the one or more other communication devices and a second format to be used by a different communication device from among the first communication device and the one or more other communication devices; the at least one processor is further configured to:

during the interaction, convert data transmitted from the given communication device to the different communication device, from the first format to the second format; and convert data transmitted from the different communication device to the given communication device, from the second format to the first format of the first interaction application.

19. A computerized device configured to manage interactions between a plurality of users, the users including a caller and one or more recipients; each user is capable of participating in an interaction via a respective communication device; each communication device is capable of running a plurality of interaction applications for conducting interactions with other communication devices executed on a communication network; the computerized device comprises at least one processor;

in response to a request received from a first communication device, to conduct an interaction with one or more other communication devices, the at least one processor is configured to:

obtain interaction preferences of a caller using the first communication device, wherein the interaction preferences of the caller include information indicative of at least one preferred caller interaction application for conducting the interaction;

obtain interaction preferences of at least one recipient using a respective communication device from among the one or more other communication devices, wherein the interaction preferences of the at least one recipient include information indicative of at least one preferred recipient interaction application for conducting the interaction;

determine whether there is a conflict between the interaction preferences of different users, wherein the at least one preferred caller interaction application is different than the at least one preferred recipient interaction application, and applying decision logic for resolving the conflict; and provide a recommendation, based at least on the interaction preferences of the caller including the at least one preferred caller interaction application and the interaction preference of the at least one recipient including the at least one recipient interaction application;

wherein the recommendation is indicative of at least one recommended interaction application to be used for data communication in the interaction;

wherein the recommendation is further indicative of a first interaction application of a first type to be used by a given communication device from among the first communication device and the one or more other communication devices and a second interaction application of a second type to be used by a different communication device from among the first communication device and the one or more communication devices; the at least one processor is further configured to:

during the interaction, convert data transmitted from the given communication device to the different communication device, from a format of the first interaction application to a format of the second interaction application; and convert data transmitted from the different communication device to the given communication device, from the format of the second interaction application to the format of the first interaction application.

20. A system comprising a plurality of computerized communication devices connected over a network; each device comprising computer memory and at least one processor; the plurality of computerized communication devices comprising:

at least a first communication device, a second communication device and an interaction management server;

wherein the server is configured to, in response to a request received from the first communication device, conduct an interaction with at least the second communication device;

obtain interaction preferences of a caller using the first communication device, wherein the interaction preferences of the caller include information indicative of at least one preferred caller interaction application for conducting the interaction;

obtain interaction preferences of at least one recipient using a respective communication device, wherein the interaction preferences of the at least one recipient include information indicative of at least one preferred recipient interaction application for conducting the interaction;

determine whether there is a conflict between the interaction preferences of different users, wherein the at least one preferred caller interaction application is different than the at least one preferred recipient interaction application, and applying decision logic for resolving the conflict; and provide a recommendation, based at least on the interaction preferences of the caller including the at least one preferred caller interaction application and the interaction preference of the at least one recipient including the at least one recipient interaction application;

wherein the recommendation is indicative of at least one recommended interaction application to be used for data communication in the interaction;

obtain information indicative that the recommended interaction application is missing from a given communication device from among the first communication device and the second communication device; and send to the given communication device an invitation to download the at least one recommended interaction application.

21. A non-transitory storage device readable by machine, tangibly embodying a program of instructions executable by the machine to perform a method of managing interactions between a plurality of users, the users including a caller and one or more recipients; each user is capable of participating in an interaction via a respective communication device; each communication device is capable of running a plurality of interaction applications for conducting interactions with other communication devices executed on a communication network, the method comprising:

in response to a request received from a first communication device, to conduct an interaction with at least one other communication device, with the help of a processor performing at least the following:

obtaining interaction preferences of a caller using the first communication device, wherein the interaction preferences of the caller include information indicative of at least one preferred caller interaction application for conducting the interaction;

obtaining interaction preferences of at least one recipient using a respective communication device from among the one or more other communication devices, wherein the interaction preferences of the at least one recipient include information indicative of at least one preferred recipient interaction application for conducting the interaction;

determining whether there is a conflict between the interaction preferences of different users, wherein the at least one preferred caller interaction application is different than the at least one preferred recipient interaction application, and applying decision logic for resolving the conflict;

providing a recommendation, based at least on the interaction preferences of the caller including the at least one preferred caller interaction application and the interaction preference of the at least one recipient including the at least one recipient interaction application;

wherein the recommendation is indicative of at least one recommended interaction application to be used for data communication in the interaction;

obtaining information indicative that the recommended interaction application is missing from a given communication device from among the first communication device and the one or more other communication devices; and sending to the given communication device an invitation to download the at least one recommended interaction application.

22. The non-transitory storage device according to claim 21, wherein the recommendation is provided based on real-real time information with respect to the first communication device and/or the one or more other communication devices thereby adapting the recommendation to the currently available resources.

23. A non-transitory storage device readable by machine, tangibly embodying a program of instructions executable by the machine to perform a method of managing interactions between a plurality of users, the users including a caller and one or more recipients; each user is capable of participating in an interaction via a respective communication device; each communication device is capable of running a plurality of interaction applications for conducting interactions with other communication devices executed on a communication network, the method comprising:

in response to a request received from a first communication device, to conduct an interaction with at least one other communication device, with the help of a processor performing at least the following:

obtaining interaction preferences of a caller using the first communication device, wherein the interaction preferences of the caller include information indicative of at least one preferred caller interaction application for conducting the interaction;

obtaining interaction preferences of at least one recipient using a respective communication device from among the one or more other communication devices, wherein the interaction preferences of the at least one recipient include information indicative of at least one preferred recipient interaction application for conducting the interaction;

determining whether there is a conflict between the interaction preferences of different users, wherein the at least one preferred caller interaction application is different than the at least one preferred recipient interaction application, and applying decision logic for resolving the conflict;

providing a recommendation, based at least on the interaction preferences of the caller including the at least one preferred caller interaction application and the interaction preference of the at least one recipient including the at least one recipient interaction application;

wherein the recommendation is indicative of at least one recommended interaction application to be used for data communication in the interaction;

wherein the recommendation is further indicative of a first interaction application of a first type to be used by a given communication device from among the first communication device and the one or more other communication devices and a second interaction application of a second type to be used by a different communication device from among the first communication device and the one or more other communication devices;

during the interaction, converting data transmitted from the given communication device to the different communication device, from a format of the first interaction application to a format of the second interaction application; and converting data transmitted from the different communication device to the given communication device, from the format of the second interaction application to the format of the first interaction application.

24. A system comprising a plurality of computerized communication devices connected over a network; each device comprising computer memory and at least one processor; the plurality of computerized communication devices comprising:

at least a first communication device, a second communication device and an interaction management server;

wherein the server is configured to, in response to a request received from the first communication device, conduct an interaction with at least the second communication device;

obtain interaction preferences of a caller using the first communication device, wherein the interaction preferences of the caller include information indicative of at least one preferred caller interaction application for conducting the interaction;

obtain interaction preferences of at least one recipient using a respective communication device, wherein the interaction preferences of the at least one recipient include information indicative of at least one preferred recipient interaction application for conducting the interaction;

determine whether there is a conflict between the interaction preferences of different users, wherein the at least one preferred caller interaction application is different than the at least one preferred recipient interaction application, and applying decision logic for resolving the conflict;

provide a recommendation, based at least on the interaction preferences of the caller including the at least one preferred caller interaction application and the interaction preference of the at least one recipient including the at least one recipient interaction application;

wherein the recommendation is indicative of at least one recommended interaction application to be used for data communication in the interaction;

wherein the recommendation is further indicative of a first interaction application of a first type to be used by a given communication device from among the first communication device and the second communication device and a second interaction application of a second type to be used by a different communication device from among the first communication device and the second communication device; the at least one processor is further configured to:

during the interaction, convert data transmitted from the given communication device to the different communication device, from a format of the first interaction application to a format of the second interaction application; and convert data transmitted from the different communication device to the given communication device, from the format of the second interaction application to the format of the first interaction application.

* * * * *

UNITED STATES PATENT AND TRADEMARK OFFICE
CERTIFICATE OF CORRECTION

PATENT NO. : 9,883,043 B2
APPLICATION NO. : 14/464028
DATED : January 30, 2018
INVENTOR(S) : Ben Volach Page 1 of 1

It is certified that error appears in the above-identified patent and that said Letters Patent is hereby corrected as shown below:

On the Title Page

Add Item (60) that includes the priority data below as follows:

(60) Related U.S. Application Data
Provisional application No. 61/867,772, filed on August 20, 2013.

Signed and Sealed this
Seventeenth Day of April, 2018

Andrei Iancu
*Director of the United States Patent and Trademark Office*